United States Patent Office 2,942,989
Patented June 28, 1960

2,942,989
MEAT CURING COMPOSITION

Jerome A. Meusel and Ralph A. Brunn, Baltimore, Md., assignors to The Baltimore Spice Company, Baltimore, Md., a corporation of Maryland No Drawing. Filed Sept. 17, 1959, Ser. No. 840,512

7 Claims. (Cl. 99—222)

This invention relates to meat curing compositions. More particularly it relates to an improvement in dry compositions based on alkali metal nitrite salts as the active curing agent and to the stabilization of such compositions.

Meat curing compositions conventionally consist of alkali metal nitrite as the principal active curing agent, together with alkali metal nitrate as a supplemental cure and one or more other ingredients such as sodium chloride, sucrose, dextrose, lactose, or other similar materials. Compositions of this nature may be applied either in dry form, e.g. a dry mixture of the several ingredients in powder form, or as a brine prepared by dissolving the composition in water.

Whichever method of use is employed, it is desirable that the potency of the composition be uniform from one batch to the next and that the cure which is effected should be uniform and reproducible.

When dry compositions based on alkali metal nitrite as the principal curing agent are stored for long intervals, or are exposed to humid atmospheres and elevated temperatures prior to actual use, it has been found that the potency of the cure has been seriously diminished.

While we do not wish to be bound by any specific theory, it is believed that the deterioration of the curing composition results from the decomposition of the nitrite in said composition with the ultimate conversion of the nitrite to nitrate, and that this decomposition is enhanced by the presence of oxygen or other oxidizing agents in an environment which also includes moisture in any form and that the deterioration of the cure proceeds at an accelerated rate at higher temperatures such as those common in subtropical and tropical climates.

One object of the invention is therefore to provide meat curing compositions which may be stored for extended periods of time and which remain stable during such storage.

A second recognized disadvantage experienced with dry compositions formulated for the curing of meat is a tendency to agglomeration caused by moisture supplied by the ambient air. This tendency is particularly aggravated when a substantial fraction of the composition may itself be hygroscopic.

The agglomeration of particles is particularly undesirable when the meat curing composition is to be used in the dry state, rather than being applied as a solution, for it results in an uneven application of the cure with a resultant spotty cure. Uncured spots, of course, constitute a hazard since they may become the seat of bacterial action. Since the shipping of meat cures in solution is economically unattractive because of the large dead weight of water, dry meat cures are preferred.

One prior art approach to this problem has been the addition of various additives to film the particles of a dry meat cure and to prevent the access of moisture to the particles, thereby preventing caking and agglomeration. Unfortunately such treatments are wholly ineffective against water present in the composition as water of crystallization, or water present on the surface of the individual particles at the time of application of the additive. Furthermore as will appear below, the resulting compositions do not retain their potency as meat cures and are not characterized by the degree of stability required for use in tropical and subtropical climates.

Briefly in accordance with the present invention silica gel is added to the dry ingredients constituting the meat curing composition, whereby any moisture present in the constituents is rapidly absorbed into the pores of the gel and prevented from participating in the oxidation of the alkali metal nitrite. It has been found that silica gel in the form of particles having a particle size of between 10 and 20 microns and an active surface of not less than 500 square meters per gram and preferably between 500–800 square meters per gram was particularly effective in the practice of the present invention.

The amount of silica gel which is sufficient to keep simultaneously the nitrite from decomposing and the particles of the dry composition from agglomerating, depends to some extent on the absorptive power of the silica gel used and the severity of the conditions to which the cure is exposed prior to use.

The silica gel when mixed intimately with the crystals immediately absorbs all the water which is liberated possibly from water present as water of crystallization or which reaches the dry cure in the form of vapor from the surrounding atmosphere, thus preventing all processes which proceed only in the presence of water.

With respect to the decomposition of the sodium nitrite it has been noted that decomposition is not so much due to the presence of water itself, but appears to be due to the presence of trace metal ions in the water which act as a catalyst in the oxidation process. As the silica gel also absorbs such trace metals ions along with the water containing them it suppresses this catalytic action.

The action of the silica gel on the nitrogen-containing alkali metal salts is the same, whatever the other components of the curing composition. From this it may be deducted that the action of the silica gel is a direct protective action and is not produced indirectly by the action on one of the other components of the mixture. We prefer to add the silica gel at the rate of approximately one-half percent by weight of the entire mixture including not only the nitrogen-containing metal salts but also the above named ingredients, but as will appear below, the benefits of the invention may be obtained with the use smaller or larger amounts of silica gel in the dry composition. Because of the effectiveness of silica gel, no advantage was found in adding more that 1 pound of silica gel per 100 pounds of dry cure and as little as 4 ounces per 100 pounds was also found to be effective. That is, the mount of silica gel should comprise between ¼% and about 1% by weight of the composition. It will therefore be understood that the amount of silica gel used may be varied according to the anticipated humidity and temperatures to which it is likely to be exposed prior to use.

The following data will serve to further illustrate the present invention.

A basic cure was formulated by mixing the following ingredients as dry powders until a homogeneous mixture was obtained:

|  | Pounds |
|---|---|
| Sodium chloride | 90 |
| Sodium nitrate | 4 |
| Sodium nitrite | 6 |

Portions of the above meat cure composition were admixed with stabilizing agents and stored in open cardboard containers. At the end of two weeks the compositions were visually examined with the following results:

| Additive | Rate #/100# Cure | Physical Appearance | Color |
| --- | --- | --- | --- |
| 1. Propylene Glycol | 1 | Lumpy, slightly sticky. | Yellow. |
| 2. U.S.P. Glycerine | 1 | Lumpy, sticky | Do. |
| 3. Corn Oil | 1 | do | Do. |
| 4. Tri-calcium phosphate | 1 | Soft, Free Running. | Yellow on top. |
| 5. Silica gel | 1 | do | White. |
| 6. Calcium Stearate | 1 | do | Yellow on top. |
| 7. Darco | 1 | do [1] | Dark Gray. |
| 8. No Addition | 0 | Firm | Pale Yellow. |
| 9. Corn Syrup Solids | 2 | Firm, unsuitable | Yellow on top. |
| 10. Dextrose | 2 | Lumpy | Do. |

[1] Unsuitable because of color.

To the same basic cure composition, various amounts of silica gel were added and the resulting compositions, after intimate admixing were stored under similar conditions. When examined 10 and 17 days later, the following observations were made:

| Rate of Addition | Hardening | Color |
| --- | --- | --- |
| 1. 1 oz. per 100# cure | Surface Firm | White. |
| 2. 4 oz. per 100# cure | Free Running | Do. |
| 3. 8 oz. per 100# cure | do | Do. |
| 4. 1 lb. per 100# cure | do | Do. |
| 5. 5 lb. (replace salt) | do | Do. |

The above results may be summarized as follows: The use of 300 to 325 mesh silica gel appeared to prevent decomposition of the sodium nitrite containing dry cure and to maintain the free-running characteristics of the cure. With prolonged exposure to humid atmosphere one ounce per 100 pounds was not sufficient, but would be adequate in dry or less humid environments.

Other tests were made with silica gel having particle sizes between plus No. 10 screen and sub-micron size. Provided a sufficient absorptive surface area was present to prevent accumulation of moisture on the alkali metal nitrite particles, the cures retained their stability and potency and free running characteristics.

The following table contains four examples, I, II, III, IV, of curing compositions with different ingredients. Various other compositions may be employed as cures including a composition consisting only of sodium nitrite, sodium nitrate, and silica gel.

Table

| | I, percent | II, percent | III, percent | IV, percent |
| --- | --- | --- | --- | --- |
| Sodium Nitrite (NaNO₂) | 6 | 6 | 6 | 6 |
| Sodium Nitrate (NaNO₃) | 4 | 4 | 4 | 4 |
| Silica Gel of the Type Defined | ½ | ½ | ½ | ½ |
| Sodium Chloride (NaCl) | 89.5 | | | |
| Sucrose | | 89.5 | | |
| Dextrose | | | 89.5 | |
| Lactose | | | | 89.5 |

The process of adding the silica gel consists merely in intimately mixing it with the other ingredients with any suitable mixing means. It will be noted that the silica gel is a neutral and non-toxic substance which in no way affects adversely any human organ or tissue. In fact, silicic acid is part of the human body and is thus what is called a physiological substance so that its application in connection with an article of food is considered as safe.

Its introduction into the curing composition permits the stabilization of the mixture during the shipping and handling period as well as during a storage period and is therefore of considerable commercial interest.

It will be clear that variations of the compositions disclosed may readily be resorted to without constituting a departure from the principles of the invention as defined by the annexed claims.

Thus in the examples above in the meat cures illustrated, sodium nitrite and sodium nitrate were used for convenience. The corresponding salts of potassium or other alkali metals could be substituted where low-sodium products are desired for medical reasons, without departing from the scope of the present invention.

This application is a continuation-in-part of our co-pending application Serial No. 684,858, filed September 19, 1957, now abandoned.

We claim:

1. In a dry, granular meat curing composition containing alkali metal nitrite, the improved method of stabilizing the composition and preventing the agglomeration of particles and the premature oxidation of the nitrite in the composition which consists in adding to the composition and mixing therewith silica gel particles, said silica gel particles having an active surface of not less than 500 square meters per gram.

2. In a dry granular meat curing composition, containing sodium nitrite, the improved method of stabilizing the composition and preventing the agglomeration of particles and the premature oxidation of the sodium nitrite in the composition which consists in adding to the composition and mixing therewith approximately ½% by weight of the composition of silica gel particles, said silica gel particles having an active surface of 500–800 m.² per gram.

3. In a meat curing composition, containing sodium nitrite and sodium nitrate, the improved method of stabilizing the composition and of preventing the agglomeration of particles and the premature oxidation of the sodium nitrite in the composition, which consists in adding to the composition and mixing therewith approximately ½% by weight of the composition of silica gel, said silica gel being of a particle size of 10–20 microns and having an active surface of 500–800 m.² per gram.

4. In a dry, granular meat curing composition containing alkali metal nitrite, the improved method of stabilizing the composition and of preventing premature oxidation of the nitrite in the composition which consists in adding to the composition and mixing therewith, particles of silica gel.

5. The method of claim 4 wherein the silica gel comprises between about ¼% and about 1% by weight of the composition.

6. A dry granular meat-curing composition consisting essentially of about 90 parts by weight of sodium chloride, 4 parts by weight of sodium nitrate and 6 parts by weight of sodium nitrite and containing between about ¼% by weight and 1% by weight of silica gel particles, uniformly distributed throughout the mixture to stabilize the mixture against premature oxidation of the sodium nitrite.

7. A dry granular meat-curing composition consisting essentially of particles of sodium chloride and alkali metal nitrate and nitrite, and containing between about ¼% and 1% by weight of the mixture of silica gel particles uniformly distributed throughout the mixture to stabilize the mixture against premature oxidation of the alkali metal nitrite.

References Cited in the file of this patent

UNITED STATES PATENTS 201,811   McCulley _____ Mar. 26, 1878

OTHER REFERENCES

"Laboratory Technique in Organic Chemistry," 1938 by A. D. Morton, published by McGraw-Hill Book Company, Inc., New York, pp. 152 and 187.